US007092595B2

(12) United States Patent
Sorin et al.

(10) Patent No.: US 7,092,595 B2
(45) Date of Patent: Aug. 15, 2006

(54) MULTIPLE-WAVELENGTH PULSED LIGHT SOURCE FOR A WAVELENGTH DIVISION MULTIPLEXED PASSIVE OPTICAL NETWORK

(75) Inventors: Wayne V. Sorin, Mountain View, CA (US); Ben J. Vakoc, Cambridge, MA (US)

(73) Assignee: Novera Optics, Inc., Santa Clara, CA (US)

( * ) Notice: Subject to any disclaimer, the term of this patent is extended or adjusted under 35 U.S.C. 154(b) by 241 days.

(21) Appl. No.: 10/849,287

(22) Filed: May 18, 2004

(65) Prior Publication Data
US 2005/0259989 A1 Nov. 24, 2005

(51) Int. Cl.
  *G02B 6/28* (2006.01)
  *H04J 14/02* (2006.01)
(52) U.S. Cl. ............................... 385/24; 385/1; 385/11; 385/42; 398/47; 398/79; 398/82; 398/91
(58) Field of Classification Search ................ 385/24, 385/40, 42, 1, 2, 3, 11, 129, 130, 131; 398/47, 398/75, 79, 82, 83, 91
See application file for complete search history.

(56) References Cited
U.S. PATENT DOCUMENTS
2003/0142978 A1* 7/2003 Lee et al. .................... 398/34

2005/0074240 A1* 4/2005 Jung et al. .................... 398/72
2005/0152696 A1* 7/2005 Shin et al. .................... 398/71

OTHER PUBLICATIONS

K.-Y. Liou et al., "A WDM Access System Architecture Based on Spectral Slicing of an Amplified LED and Delay-Line Multiplexing and Encoding of Eight Wavelength Channels for 64 Subscribers", IEEE Photonics Technology Letters, vol. 9, No. 4, Apr. 1997, pp. 517-519.
Jason B. Stark et al., "Cascaded WDM Passive Optical Network with a Highly Shared Source", IEEE Photonics Technology Letters, vol. 9, No. 8, Aug. 1997, pp. 1170-1172.
C. R. Giles, "1152-Subscriber WDM Access PON Architecture Using a Sequentially Pulsed Multifrequency Laser", IEEE Photonics Technology Letters, vol. 9, No. 9, Sep. 1997, pp. 1283-1284.

* cited by examiner

*Primary Examiner*—Brian Healy
(74) *Attorney, Agent, or Firm*—Blakely, Sokoloff, Taylor & Zafman LLP (57) ABSTRACT

Various methods and apparatuses are described for a multiple wavelength light source. The multiple wavelength light source may be located in a central office to supply a first broad band of wavelengths for a one or more passive optical networks. The multiple wavelength light source generates a series of four or more pulses of light in the first broad band of wavelengths. Each pulse of light in that series has a different center wavelength. The series of pulses of light in the first broad band of wavelengths may be repeated at a channel data rate of an optical receiver at a subscriber's location.

26 Claims, 8 Drawing Sheets

MULTIPLE-WAVELENGTH PULSED LIGHT SOURCE FOR A WAVELENGTH DIVISION MULTIPLEXED PASSIVE OPTICAL NETWORK

FIELD

Embodiments of the invention relate to passive optical networks to passive optical networks using a multiple wavelength pulsed light source and a high-speed data modulator.

BACKGROUND

In a typical wavelength division multiplexed passive optical network system, the system may require multiple optical transmitters to exist in the central office. For example, the system may have thirty two optical transmitters per passive optical network having thirty two subscribers. This results in a high cost, a large physical space occupied in the central office, and a high power consumption per optical passive optical network. Eliminating the multiple optical transmitters per passive optical network and replacing the multiple transmitters per optical network with a single high-speed modulator could improve the cost, size, and power consumption associated with the multiple optical transmitters. As discussed, typically, a dedicated wavelength or channel exists for each end user/subscriber in a passive optical network. This typically requires a dedicated optical transmitter and a dedicated optical receiver for each subscriber in the central office. The multiple optical transmitters in the central office may be replaced with a one or a few high-speed modulated wavelength light sources.

SUMMARY

Various methods and apparatuses are described for a multiple wavelength light source. The multiple wavelength light source may be located in a central office to supply a first broad band of wavelengths for a one or more passive optical networks. The multiple wavelength light source generates a series of four or more pulses of light in the first broad band of wavelengths. Each pulse of light in that series has a different center wavelength. The series of pulses of light in the first broad band of wavelengths may be repeated at a channel data rate of an optical receiver at a subscriber's location.

Other features and advantages of the present invention will be apparent from the accompanying drawings and from the detailed description that follows below.

BRIEF DESCRIPTION OF THE DRAWINGS

The present invention is illustrated by example and not limitation in the figures of the accompanying drawings, in which like references indicate similar elements, and in which.

DETAILED DESCRIPTION

In general, various methods and apparatuses are described for a master multiple wavelength light source. The master multiple wavelength light source may be located in a central office to supply a first broad band of wavelengths for a one or more passive optical networks. The multiple wavelength light source generates a series of four or more pulses of light in the first broad band of wavelengths. The first broad band of wavelengths may be wave division multiplexed and time division multiplexed to generate the series of pulses of light. Each pulse of light in that series has a different center wavelength. The series of pulses of light in the first broad band of wavelengths may be repeated at a channel data rate of an optical receiver at a subscriber's location. The series of pulses of light may be distributed to each passive optical network to be data encoded for users (i.e., subscribers) in that passive optical network. The polarization characteristics of the pulses of light in the first broad band of wavelengths may be controlled to data modulate the pulses of light independent of the light having any particular polarization characteristic.

Figure 1:
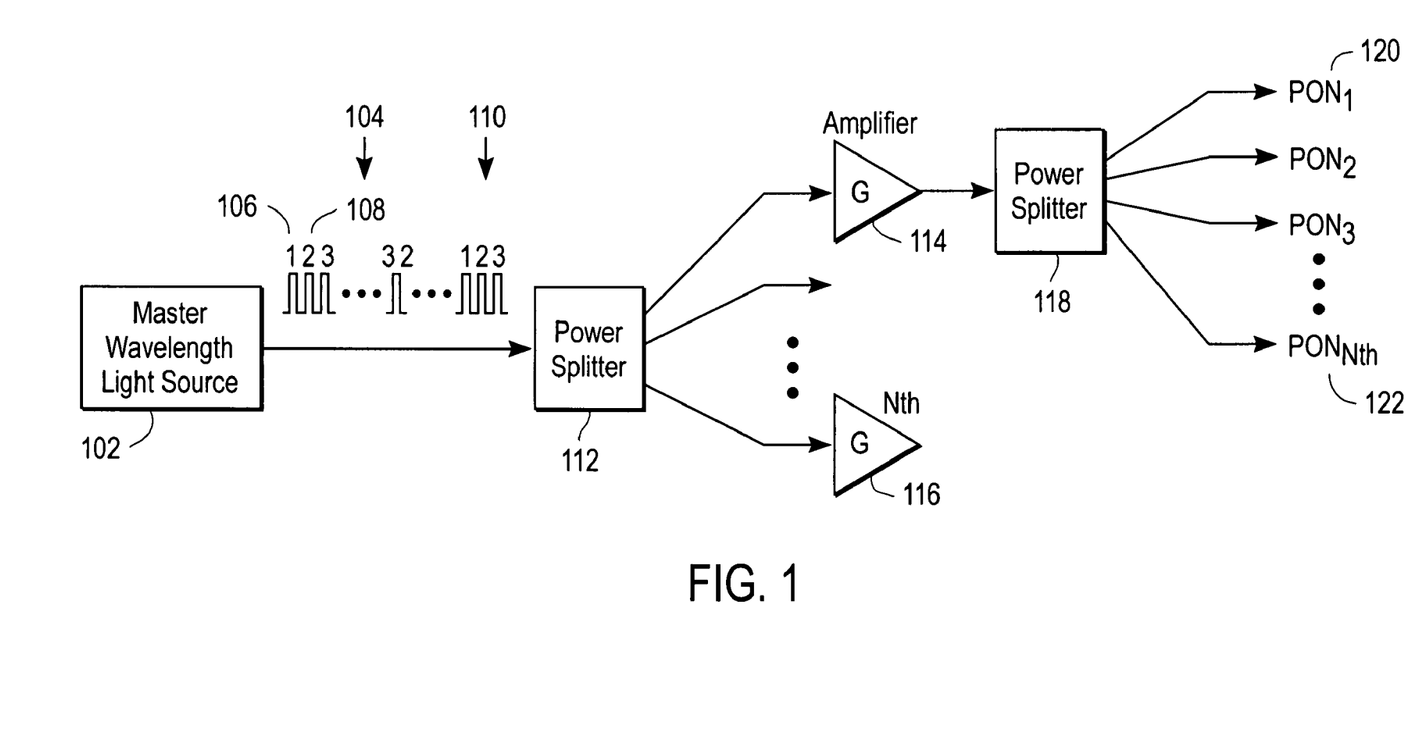
FIG. 1 is a block diagram of an embodiment of a master multiple wavelength light source that supplies a broadband of wavelengths for one or more passive optical networks.

FIG. 1 illustrates a block diagram of an embodiment of a master multiple wavelength light source that supplies a broadband of wavelengths for one or more passive optical networks. The master wavelength light source 102 may provide a broadband of wavelengths that are separated in wavelength and in time. For example, the master wavelength light source 102 may generate a series of four or more pulses of light. Each pulse of light in that series has a different center wavelength. Each pulse of light in that series is also offset from a neighboring pulse of light by a fixed amount of time, such as an offset delay time between each pulse. For example, a first series of pulses of light 104 may contain thirty-two pulses of light 104, where each pulse of light is offset in center wavelength and time from another pulse of light. The first pulse of light 106 is offset in offset in center wavelength from the second pulse of light 108. The entire series of pulses of light 104 may be repeated in a next time slot such as a channel data rate of an optical receiver at a subscriber's location in a passive optical network. For example, the first series of thirty-two pulses of light 104 may cumulatively span the time period equal to the channel data rate of an optical receiver. A small time delay may occur before the series of pulses of light repeats. Next, the second series of thirty-two pulses of light 110 cumulatively spans the time period equal to the channel data rate of an optical receiver.

The master wavelength light source 102 may send the series of pulses of light to a first power splitter 112. The first power splitter 112 may distribute that optical bit stream, i.e., series of pulses of light 104, 110, to a number of amplifiers such as a first amplifier 114 through an nth amplifier 116. The series of pulses of light 104, 110 may be amplified by the amplifiers to make up for any losses or any power needed to transmit that series of pulses of light to a destination passive optical network. Each amplifier may send the series of pulses of light to another power splitter 118 to supply N number of passive optical networks 120, 122 with this series of pulses of light.

For example, the first amplifier 114 may send the series of pulses of light 104, 110 to a second power splitter 118. The second power splitter 118 may replicate the series of pulses of light and send that series of pulses of light to a multiple passive optical networks such as first passive optical network 120 through an nth passive optical network 122. For example, the first power splitter 112 may send this series of pulses of light to one hundred passive optical networks. The series of pulses of light may be data encoded within each passive optical network for users (i.e. subscribers) in that passive optical network. The single master wavelength light source 102 may therefore supply discrete wavelengths in an optical bit stream for a number of passive optical networks such as one hundred passive optical networks and for N number of subscribers within that passive optical network such as thirty-two.

Thus, the single master wavelength light source 102 supplies this first broad band of wavelengths that contains a series of multiple wavelengths 104, where each wavelength has its own center wavelength and only one center wavelength is present in the light signal at any specific point in time. Each center wavelength is offset by a time delay such that the optical signal may appear to be a bit stream of optical pulses. The light signal containing the first broad band of wavelengths may be considered to be both time division multiplexed and wave division multiplexed.

The light signal containing the first broad band of wavelengths offset in time is distributed and supplied to the multiple passive optical network systems. Each passive optical network may have it's own high speed data modulator that can encode data and supply the, for example, thirty-two unique subscribers of that passive optical network with data.

A typical rack in a central office may contain 30 to 60 passive optical network systems. A single master wavelength light source 102 in that rack could supply a time division multiplexed and wave division multiplexed optical bit stream to each of these passive optical networks. Each of these passive optical networks supplying a number of subscribers equal to or less then the number of pulses in the first broad band of wavelengths.

Figure 2:
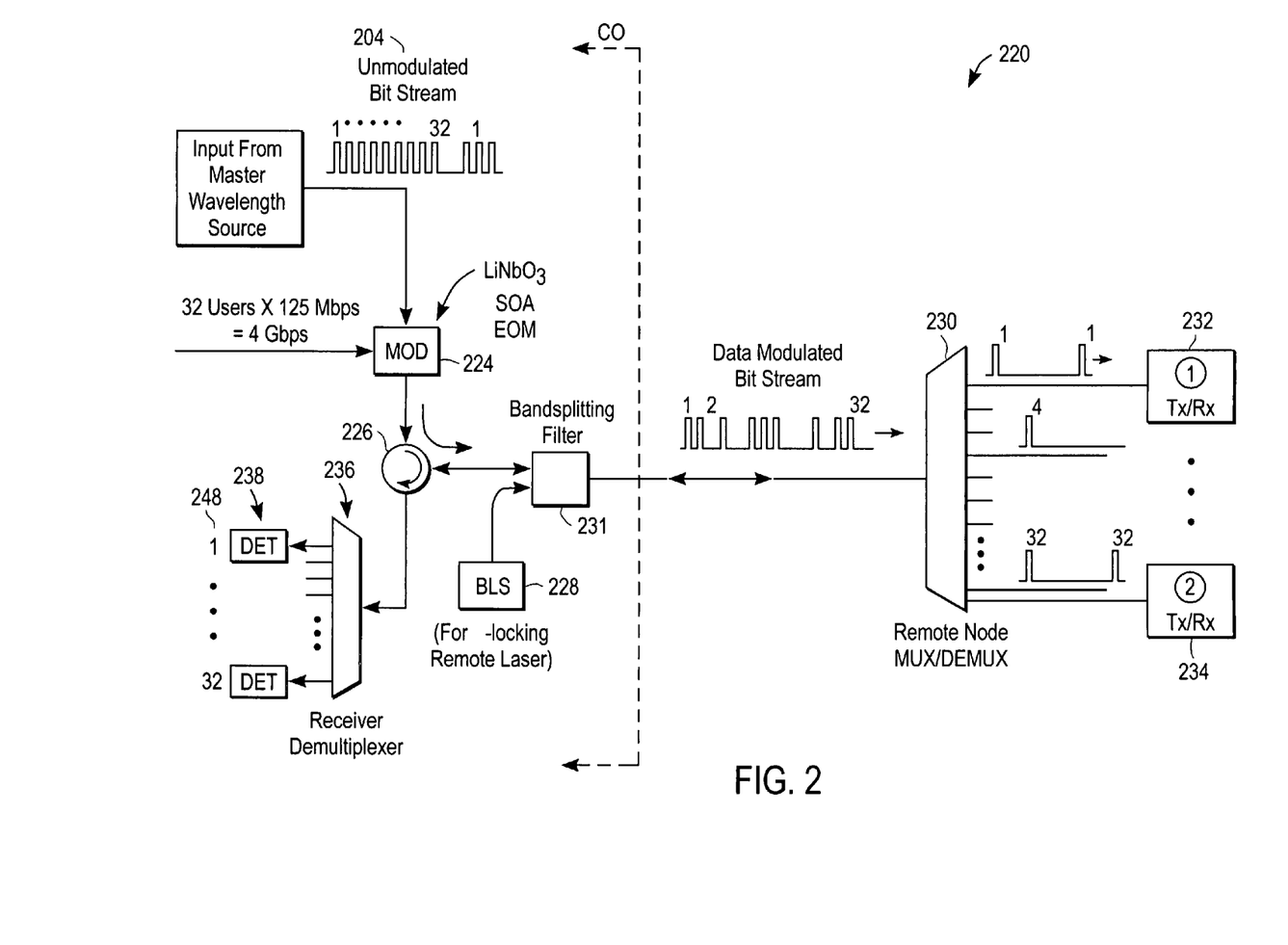
FIG. 2 is an embodiment of a block diagram of a first passive optical network containing a data modulator to data modulate the input multiple wavelength light signal from the master wavelength light source.

FIG. 2 illustrates an embodiment of a block diagram of a first passive optical network containing a data modulator to data modulate the input multiple wavelength light signal from the master wavelength light source. The first passive optical network 220 may contain a data modulator 224, a circulator 226, a broadband light source 228, a band-splitting filter 231, a remote multiplexer/demultiplexer in a remote node 230, a plurality of optical transmitters and optical receivers 232, 234 at the subscribers locations, and a local demultiplexer 236 that connects to a multitude of optical detectors 238 in the central office.

As discussed, the multiple wavelength light source 102 generates the optical bit stream 204 that contains a series of multiple wavelengths. The optical bit stream 204 is supplied to the data modulator 224 in each passive optical network. The data modulator 224 may encode data onto the optical bit stream 204 and supply the data modulated bit stream to the circulator 226. The circulator 226 may distribute that data modulated bit stream to the band-splitting filter 230. The band-splitting filter 230 supplies the data modulated light signal over the passive optical network to a remote node. A multiplexer/demultiplexer at the remote node 230 distributes the data modulated light signal to the optical receivers in that passive optical network. Each optical receiver in that passive optical network receives its own pulse of light that has been data modulated. For example, the first optical receiver 232 receives the first wavelength which has been data modulated with a logical 1. The thirty second receiver 234 receives a pulse on the thirty-second wavelength that has also been data modulated with a logical 1. The fourth optical receiver (not shown) does not receive a pulse, which indicates based on this timing that it is receiving a data bit of a logical zero at this time.

The broadband light source 228 may supply a second broadband of wavelengths through the band splitting filter to the remote multiplexer/demultiplexer 232. The operating range of the second broad band of wavelengths, such as the C-band is different than the operating range the first broad band of wavelengths such as the L-band. The remote multiplexer/demultiplexer 232 supplies a separate spectral slice of the second broadband of wavelengths to the plurality of optical transmitters at the subscriber's locations. The optical transmitters wavelength lock the operating wavelength of that transmitter to the wavelength of the injected spectral slice from the remote multiplexer/demultiplexer 232.

For example, the first optical transmitter 232 receives a first spectral slice of the second broad band of wavelengths being at a first center wavelength from the multiplexer/demultiplexer in the remote node 230. The first optical transmitter 232 at the subscriber location wavelength locks onto the center wavelength of the injected spectral slice. The first optical transmitter 232 can communicate to the central office using that wavelength. The first optical transmitter 232 transmits information back to the central office within that small band of wavelengths having the center wavelength of the first spectral slice. The second optical transmitter (not shown) at the subscriber location receives a different spectral slice from the remote multiplexer/demultiplexer 232. The wavelength of the injected spectral slice into the second optical transmitter is different in the center wavelength of the first injected spectral slice. The second optical transmitter wavelength locks onto the center wavelength of the second injected spectral slice. The second optical transmitter at the subscribers location communicates back to the central office on that second injected spectral slice center wavelength. The optical transmitters may be for example, Fabry-Perot laser diodes biased to operate both above or below the laser threshold for that laser diode.

The optical circulator 226 receives the data communications from the optical transmitters at the subscriber's location and routes those wavelengths to the local multiplexer/demultiplexer 236 in the central office. The local multiplexer/demultiplexer 236 routes the communication signal from each optical transmitter at the subscriber's locations to corresponding optical detectors 238 in the central office.

For example, a communication signal at the wavelength of the injected spectral slice from the first optical transmitter 232 is routed by the local multiplexer/demultiplexer 236 to the first optical receiver 240. The operating wavelength of the remote multiplexer/demultiplexer 230 may be matched to the central office multiplexer/demultiplexer 240 in a number of ways such as temperature matching the two multiplexer/demultiplexer devices.

Thus, the optical circulator 226 may route the first broad band of wavelengths, such as the L-band, to the remote multiplexer/demultiplexer 232. The optical circulator 226 may route the communications signals from the subscribers' optical transmitters 232, 234 in the C-band back to the optical detectors 238 in the central office.

Figure 3:
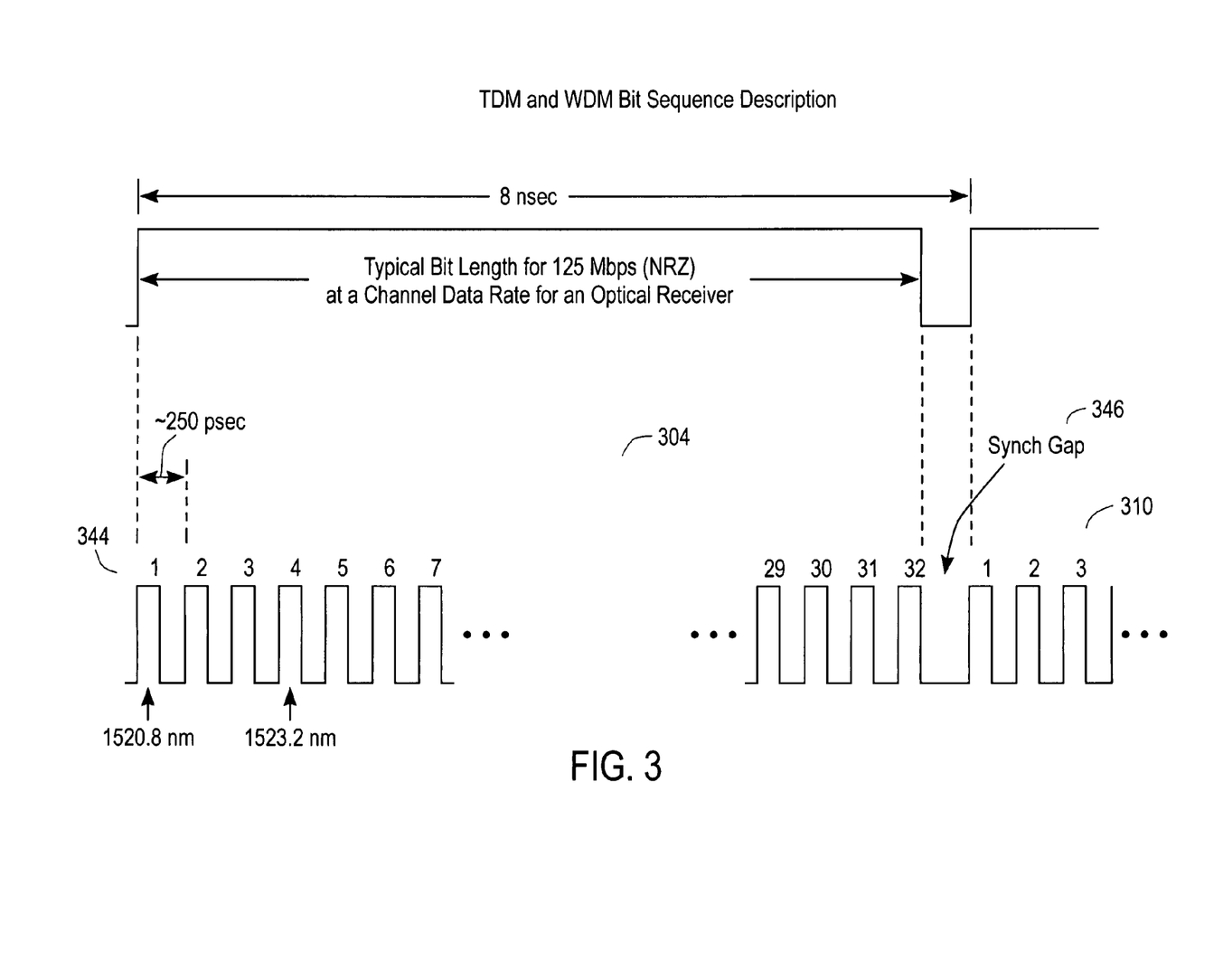
FIG. 3 is an embodiment of a signal diagram of light signal containing a first broad band of wavelength pulses offset in time and center wavelength from each other.

FIG. 3 illustrates an embodiment of a signal diagram of light signal containing a first broad band of wavelength pulses offset in time and center wavelength from each other. The light signal containing the series of pulses of light 304 may be generated at a channel data rate of an optical receiver at a subscriber's location. For example, a typical bit length 342 for a one hundred and twenty-five megabit per second channel data rate is approximately eight nanoseconds in duration. Thus, the time division multiplexed and wave division multiplexed optical bit stream 304 generated by the master wavelength light source may contain thirty-two individual pulses within that same eight nanosecond duration. Each wavelength pulse may occupy approximately a two hundred and fifty picosecond time frame within that light signal. For example, the first wavelength pulse 344 has an approximately a two hundred and fifty picosecond duration.

At the end of the first series of pulses of light 304, a synchronization marker 346 may exist to allow the optical components, such as optical receivers, data modulators, multiplexers, etc., to detect that the first series of pulses of light 304 has ended and another series of pulses of light 310 is about to begin. The second series of pulses of light 310 is repeated at the channel data rate for an optical receiver at a subscriber's location. The synchronization marker 346 may be a sink gap, pulse height increase such as a pulse four times the height of a typical data modulated pulse, or some similar indicator.

Each pulse, such as the first wavelength pulse 344, may have a wavelength centered at a specific wavelength, such as 1520.8 nanometers, within that light signal.

In order to use the same or typical commercial optical receivers, the amplitude of the pulses of data going to each optical receiver may be increased in magnitude by a significant amount. For example, if the expected channel data rate signal is approximately eight nanoseconds in duration and now the remote multiplexer/demultiplexer only routes a pulse of two hundred and fifty picoseconds or $\frac{1}{32}^{nd}$ of the time data to the optical receiver, then the pulse height of that single pulse of data may be, for example, thirty-two times higher. Thus, the shorter pulse at a higher power allows the optical receiver to still detect and understand the information being communicated from the data modulator in the central office to that receiver even though the pulse duration of the data being sent to the optical receiver has been shortened.

Referring to FIG. 1, the master multiple wavelength light source 102 may contain a depolarization device and a sequence generator. The depolarization device causes each wavelength in the light signal to have multiple polarization states. The data modulator for each passive optical network may then data modulate the light signal from the master wavelength light source 102 independent of the light signal having any particular polarization characteristic. The sequence generator generates timing signals to be communicated to the master wavelength light source 102 and to each data modulator so that the individual wavelength pulses in the light signal can be properly synchronized with the data modulator attempting to modulate each channel/wavelength pulse within that light signal.

The master multiple wavelength light source 102 may generate a modulated optical bit stream that is both wave division multiplexed and time division multiplexed. The modulated optical bit stream may be modulated at a time division multiplexing rate of at least three times a channel data rate of an optical receiver at a subscriber's location. The optical bit stream is modulated to form discrete wavelength durations such as pulses. A component such as an optical power splitter, may route the modulated optical bit stream to one or more passive optical networks. A device such as a depolarization device may control the polarization characteristics of the light in that modulated optical bit stream to data modulate the modulated optical bit stream independent of the light in that bit stream having any particular polarization characteristic.

Figure 4:
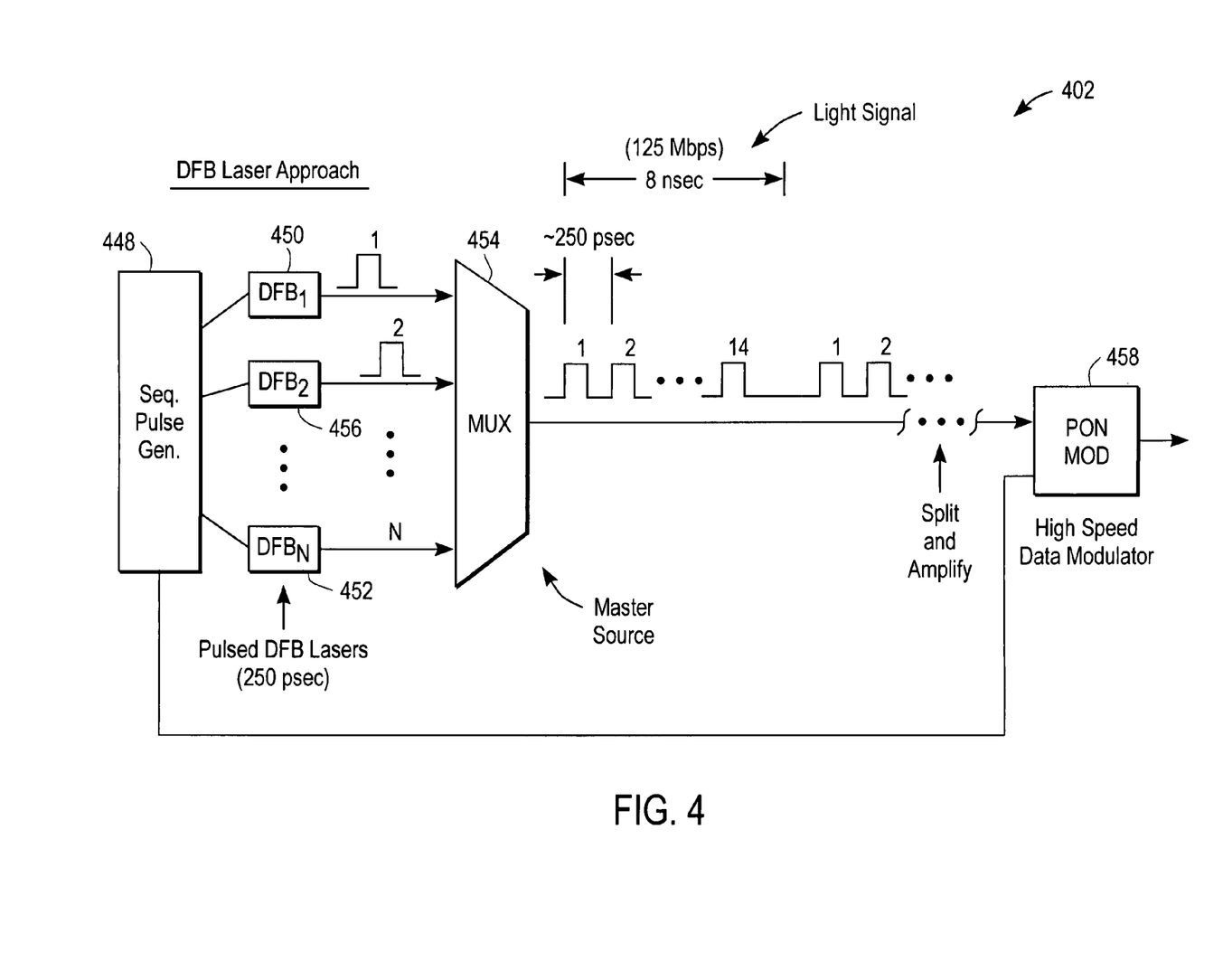
FIG. 4 is a block diagram of an embodiment of a master multiple wavelength light source.

FIG. 4 illustrates a block diagram of an embodiment of a master multiple wavelength light source. The master multiple wavelength light source 402 may contain a sequence pulse generator 448, two or more distributed feedback lasers, such as a first pulsed distributed feedback laser 450 through an nth pulsed distributed feedback laser 452, a first multiplexer 454. The first pulsed distributed feedback laser 454 has a center wavelength different than the center wavelength of the second pulsed distributed feedback laser 456. The two or more pulsed distributed feedback lasers coupled to the first multiplexer 454. The sequence pulse generator 448, such as a clock couples to all of the distributed feedback lasers 450, 452, 456.

The sequence pulse generator 448 provides timing signals to those distributed feedback lasers to generate the series of pulses of light at an offset time such that the only one center of wavelength is present in the light signal at any given time. The sequence pulse generator 448 may also couple to the high speed data modulator 458. The high speed data modulator 458 may be a polarization independent modulator such that the polarization of the series of pulses of light in the light signal is not relevant. Therefore, the sequence pulse generator 448 may generate a signal both to the distributed feedback lasers 450, 452, 456 and the high speed data modulator 458 to properly synchronize the timing of the generation of the pulses of light to be in sync with the high speed data modulator 458 encoding data onto those pulses. Alternatively, the high speed data modulator 458 may have a detector to recover the synchronization data for series of pulses to properly synchronize each wavelength in the light signal with the master wavelength light source. The sequence pulse generator 448 may generate the synchronization marker and the data modulator 458 may contain software that is looking for the synchronization marker to know when to begin the timing sequence for the next series of pulses of light in that light signal. The synchronization marker would indicate the end of a first series of pulses of light in the light signal and the start of a second series of pulses of light at the channel data rate. The high speed data modulator 458 may also analyze the incoming signal with another algorithm to determine the synchronization of the series of pulses.

As discussed, the sequence pulse generator 448 staggers the generation of the different pulses of light having different center wavelengths in order to generate a series of pulses of light in a bit stream fashion. The light signal containing the multiple wavelengths in the series of pulses of light may be split by the optical power splitters, optionally amplified, and sent to each individual passive optical network where the time division and wave division multiplexed light signal is data modulated by a polarization independent modulator. Each one of the pulses of light in this series is capable of being data modulated by the high speed data modulator 458 independent of any other pulse in that series. Each passive optical network may have its own data modulator 458.

Figure 5:
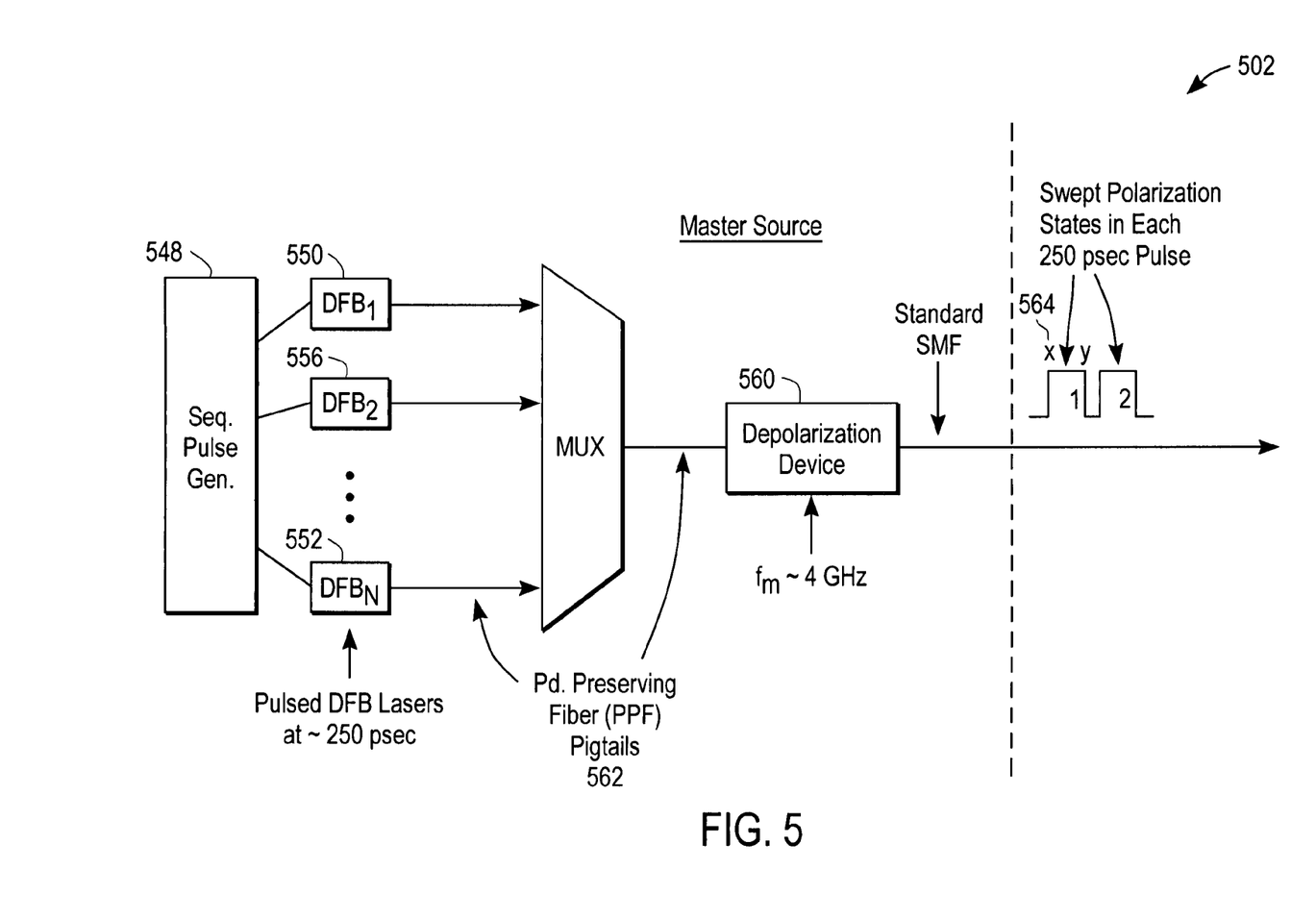
FIG. 5 is a block diagram of another embodiment of a master multiple wavelength light source.

FIG. 5 illustrates a block diagram of another embodiment of a master multiple wavelength light source. The multiple wavelength light source 502 may contain a sequence pulse generator 548 for a multitude of distributed feedback lasers 550, 552, 556, where each distributed feedback laser has a different center wavelength, a first multiplexer 554, and a depolarization device 560. The sequence pulse generator 548 may generate the series of pulses to offset the center wavelengths of each distributed feedback laser 550, 552, 556. The first multiplexer 554 may combine the different pulses at different center wavelengths from the multitude of distributed feedback lasers 550, 552, 556 into a single light signal. Polarization preserving fiber 562 may couple the distributed feedback laser to the first multiplexer 554. This polarization preserving fiber 562 may also couple the first multiplexer 554 to the depolarization device 560. The depolarization device 560 causes each pulsed wavelength in the light signal to have multiple polarization states. The depolarization device 560 may be a birefringent element, a polarization modulator, or similar device.

The depolarization device 560 may be a birefringent element such as a birefringent optical fiber. For this case, the pulse width from each DFB laser should be roughly one half of the final desired output pulse width, for example approximately 125 picoseconds. The polarized pulse from each DFB laser can be coupled with approximately equal power on to the two birefringent axes of the birefringent element. The differential polarization time delay for the birefringent element should be approximately equal to the pulse width from the DFB laser. At the output of the birefringent element, the input pulse spits into two orthogonally polarized pulses. Each orthogonally polarized pulse being offset to one another by their pulse width. The duration of the output pulse width will be approximately twice the input pulse width with the first half of the pulse being orthogonally polarized to the last half of the pulse. After each pulse is depolarized the light signal may be split, amplified, and routed using standard optical fibers that do not preserve the polarization state of the light. Thus, each pulsed wavelength will have at least some portion of that pulse that has a polarization that can be data modulated by a polarization dependent modulator, such as a standard Lithium Niobate modulator.

The depolarization device 560 may also be a polarization modulator. The polarization modulator may change the polarization state of an input pulse as a function of time. For example, the first wavelength 564 may contain an X-polarization for the first 50% of that two hundred and fifty second pulse. The first wavelength may contain a Y-polarization for the second 50% of the two hundred and fifty second pulse duration.

If a polarization modulator is the depolarization device 560, the polarization modulator may need a well defined polarization input state. The well defined polarization input state may be accomplished through the polarization preserving fiber 562.

As discussed, the data modulator in each passive optical network may be either a polarization independent modulator or a polarization dependent modulator if the depolarization device 560 is part of the master wavelength light source 502. Either way, a data modulator in a passive optical network can data modulate the light signal independent of the light signal having any particular polarization characteristic because multiple polarization states exist in each wavelength pulse.

A polarization modulator acting as the depolarization device 560 operates at a very high modulation rate such as greater than three times, such as thirty-two times, the channel data rate for an optical receiver. For example, in this case, if the light signal containing the series of pulses of light repeats at a channel data rate of one hundred and twenty-five mega bits per second then the modulation rate may be at four gigahertz. (32 individual pulses to be modulated at a 125 mega bits per second channel data rate equals approximately a 4 gigahertz modulation rate.)

Referring to FIG. 3, an example optical receiver operating at a one hundred and twenty-five mega bits per second channel data rate expects a bit length/duration of the optical pulse 342 to be, for example, eight nanoseconds in duration. However, the master wavelength light source generates multiple individual pulses, such as thirty-two, in small time intervals within that eight nanosecond duration. Each wavelength pulse goes to a corresponding subscriber and gets its own time slot within the time frame of that standard data bit duration.

The high speed optical bit stream can be sent to the remote multiplexer/demultiplexer in each passive optical network. A high speed data modulator in each passive optical network may encode data onto each pulse. The remote multiplexer/demultiplexer can separate each data modulated wavelength pulse so that each user receives only one of the original thirty-two wavelength pulses. At the optical receiver of the user, the data received will be thirty-two times shorter than the typical bit length duration for that optical receiver. However, if the peak power of the pulse is thirty-two times larger, then the optical receiver detects approximately the same information carried by pulses of longer duration.

Figure 6:
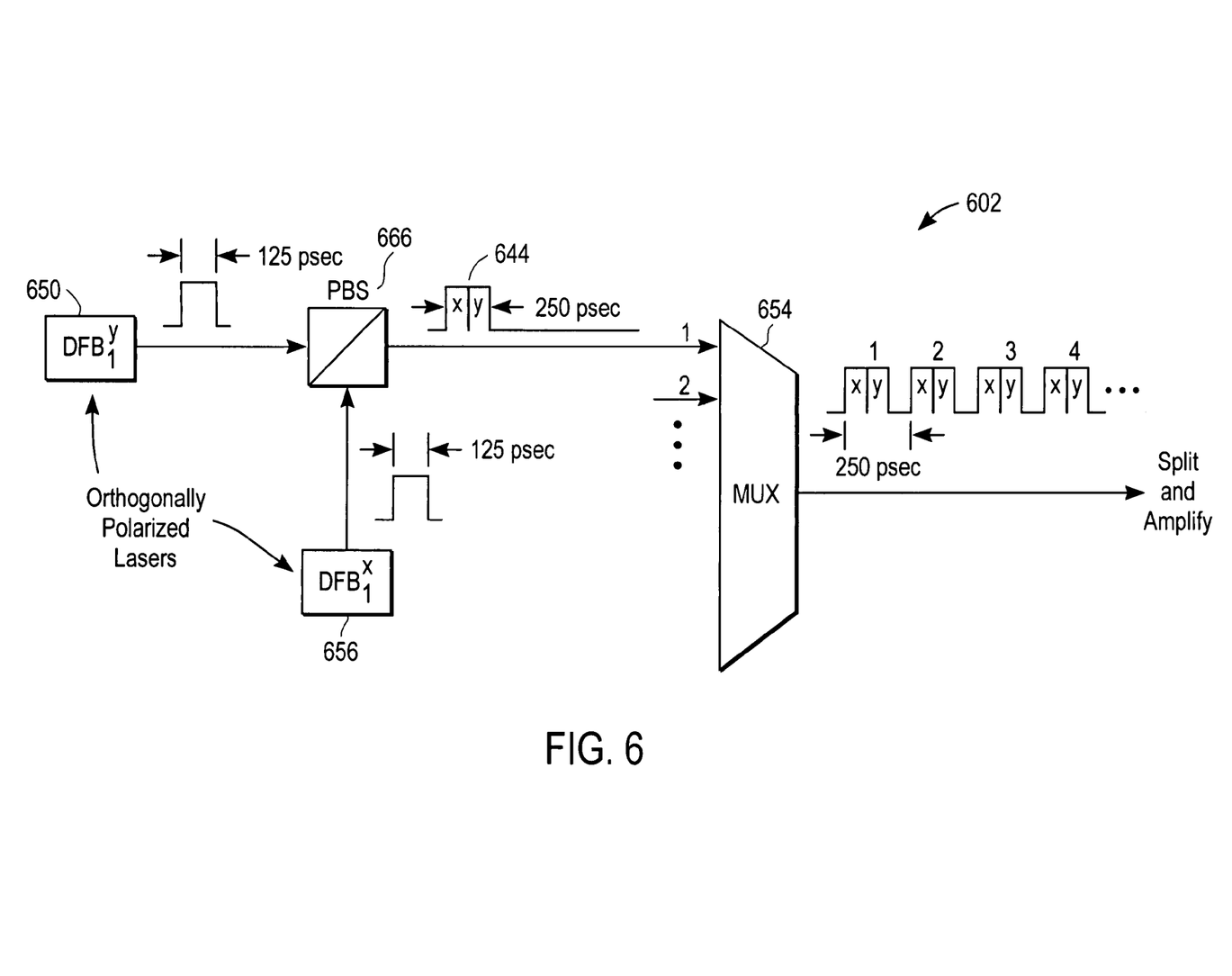
FIG. 6 is a block diagram of another embodiment of a master multiple wavelength light source.

FIG. 6 illustrates a block diagram of another embodiment of a master multiple wavelength light source. The master multiple wavelength light source 602 may contain pairs of distributed feedback lasers such as a first pair 650, 656, optical beam combiners such as a first optical beam combiner 666, and a first multiplexer 654. The depolarization device 666 for each wavelength may be composed of the optical beam combiner 666 cooperating with two distributed feedback lasers 650, 656 set with similar wavelengths to combine those signals into a pulse with multiple polarization states. The first pulsed distributed feedback laser 650 is orthogonally polarized with respect to the second pulsed distributed feedback laser 656. The optical signals from the second pulsed distributed feedback laser 656 and the first pulsed distributed feedback laser 650 may each be about 125 picoseconds in duration and offset in time from each other by 125 picoseconds to provide a first wavelength pulse 644 having a first center wavelength in the light signal. The light signals produced by the distributed feedback lasers when summed up together may total a two hundred and fifty picosecond pulse at a first center wavelength.

The optical beam combiner 666 may be a polarization beam splitting prism. The optical combiner 666 may couple to the paired distributed feedback lasers 650, 656 and the first multiplexer 654. The first polarization beam splitting prism 666 supplies the first wavelength pulse 644 in the light signal to the first multiplexer 654. The first multiplexer 654 may then supply the two hundred and fifty picosecond wavelength pulses from all of the pair distributed feedback lasers to be split and amplified. Each two hundred and fifty picosecond wavelength pulse has a different center wavelength. The optical power splitter (not shown) splits that light signal to a plurality of passive optical networks. Each pulse in that light signal has both an X-polarization state and a Y-polarization state within that single wavelength pulse.

Figure 7:
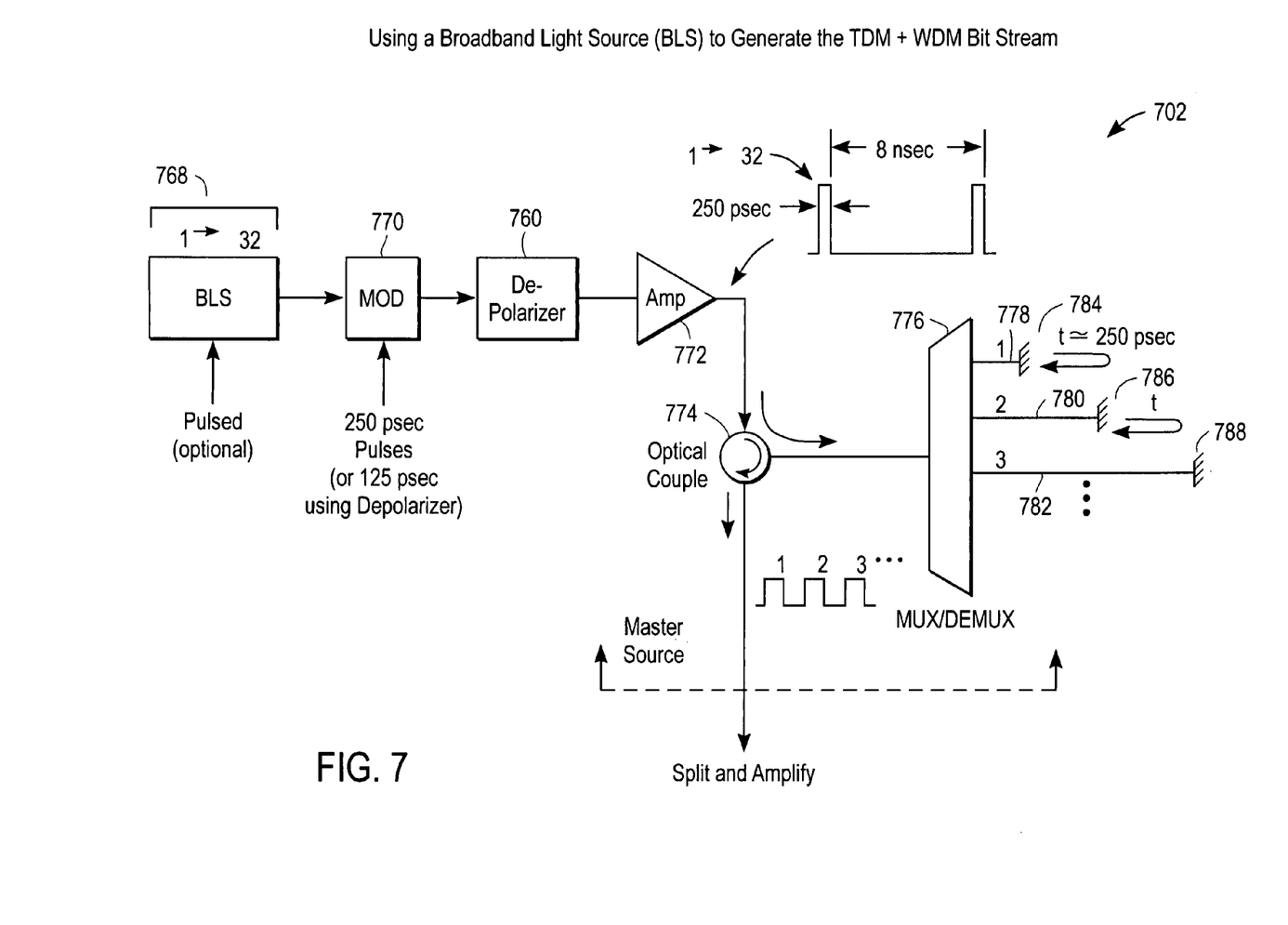
FIG. 7 is a block diagram of another embodiment of a master multiple wavelength light source.

FIG. 7 illustrates a block diagram of another embodiment of a master multiple wavelength light source. The master multiple wavelength light source 702 may contain a broadband light source 768, a modulator 770, a depolarization device 760, an amplifier 772, an optical coupler 774, a multiplexer 776 with different lengths of fiber 778–782 attached to that multiplexer 776, and reflectors 784–788 attached to those different lengths of fiber 778–782.

The broadband light source 768 supplies an optical signal containing a broadband of wavelengths, such as all thirty-two wavelengths, contained in that initial pulse of light. The broadband light source 768 may be an Erbium doped fiber amplifier, a semi-conductor optical amplifier, or a custom laser contains all the wavelengths needed to generate all of the wave division multiplexed channels. The broadband light source 768 may also be a mode locked laser that generates short pulses containing all of the wavelengths needed to generate all of the WDM channels for the awaiting passive optical network.

The modulator 770 couples to that broadband light source 768 to modulate the light into discrete pulses. The modulator 770 may be a polarization independent modulator allowing multiple polarizations to exist in each pulse of light. Alternatively, the modulator 770 may be a regular polarization dependent modulator that is coupled to a depolarizer 760, such as a birefringent element. The modulator 770 coupled to the birefringent element 760 renders multiple polarization states in each pulse of light.

The modulator 770 modulates to create an optical bit stream that is at the same repetition rate as the channel data rate of an optical receiver at a subscriber's location. For example, the modulator 770 may generate an optical pulse width with duration of about 250 picoseconds once every 8 nanoseconds. For this example, the pulsed duty cycle is equal to 32, which is the number of individual wavelength channels to be used in the passive optical network. The modulator 770 may be LiNbO$_3$ modulator, an electric optic modulator (EOM), or a semiconductor optical amplifier. The modulator 770 generates a series of short pulses, repeated at approximately the final channel data rate. The modulator 770 couples to the amplifier. The amplifier 772 amplifies each wavelength in the light signal to make up for the shortened pulse duration of each wavelength. The amplifier 772 couples to an optical circulator 774.

The optical circulator 774 routes each pulse containing the thirty-two wavelengths into a multiplexer/demultiplexer 776. The multiplexer/demultiplexer 776 spectrally slices each wavelength on to a different output. For example, the first output has a first optical length of fiber 778 and a first reflector 784. The length of the optical fibers and thus the optical paths connected to the multiplexer/demultiplexer 776 provide time delays between each one of the wavelengths in the light signal. The time delays offset each pulse having it's own center wavelength in the light signal. With each pulse having a different center wavelength and offset in time, allowing each pulse to be independently data modulated later in a passive optical network.

Thus, the optical path as connected to the multiplexer/demultiplexer 776 establishes a time delay between each optical pulse in the series. For example, a first reflector 784 and a first length of optical fiber 778 may connect to a first output of the first multiplexer/demultiplexer 776. The first wavelength pulse travels down the length of optical fiber 778 and reflects off of the first reflector 784. The light pulse for the first wavelength then travels down the length of the optical fiber 778 and couples back into an input of the multiplexer/demultiplexer 776. The second pulse containing the second center wavelength travels down the second optical fiber 780 and travels a distance such that it has a time delay offset between itself and the first wavelength pulse.

Note, rather than having reflectors at the output of the first multiplexer/demultiplexer, the multiple differential optical delays of the first multiplexer/demultiplexer can be connected to a second multiplexer/demultiplexer which can combine the time offset pulses into a single optical output. Either way, the first multiplexer/demultiplexer 776 establishes an optical path to create an offset between each pulse in time for each wavelength. The first multiplexer/demultiplexer 776 routes the time domain multiplexed and wave domain multiplexed bit stream back to the optical coupler 774. The optical coupler 774 routes the time domain and wave domain optical bit stream to a power splitter and amplifier. The power splitter and amplifier route the series of pulses of light to the plurality of passive optical networks. In each passive optical network, each of the thirty-two different wavelengths may be data modulated and routed to the optical receivers at the thirty-two different subscriber locations.

A sequence pulse generator may connects to the modulator 770 to properly synchronize each wavelength in the series of pulses in the light signal with a data modulator in a passive optical network.

Figure 8:
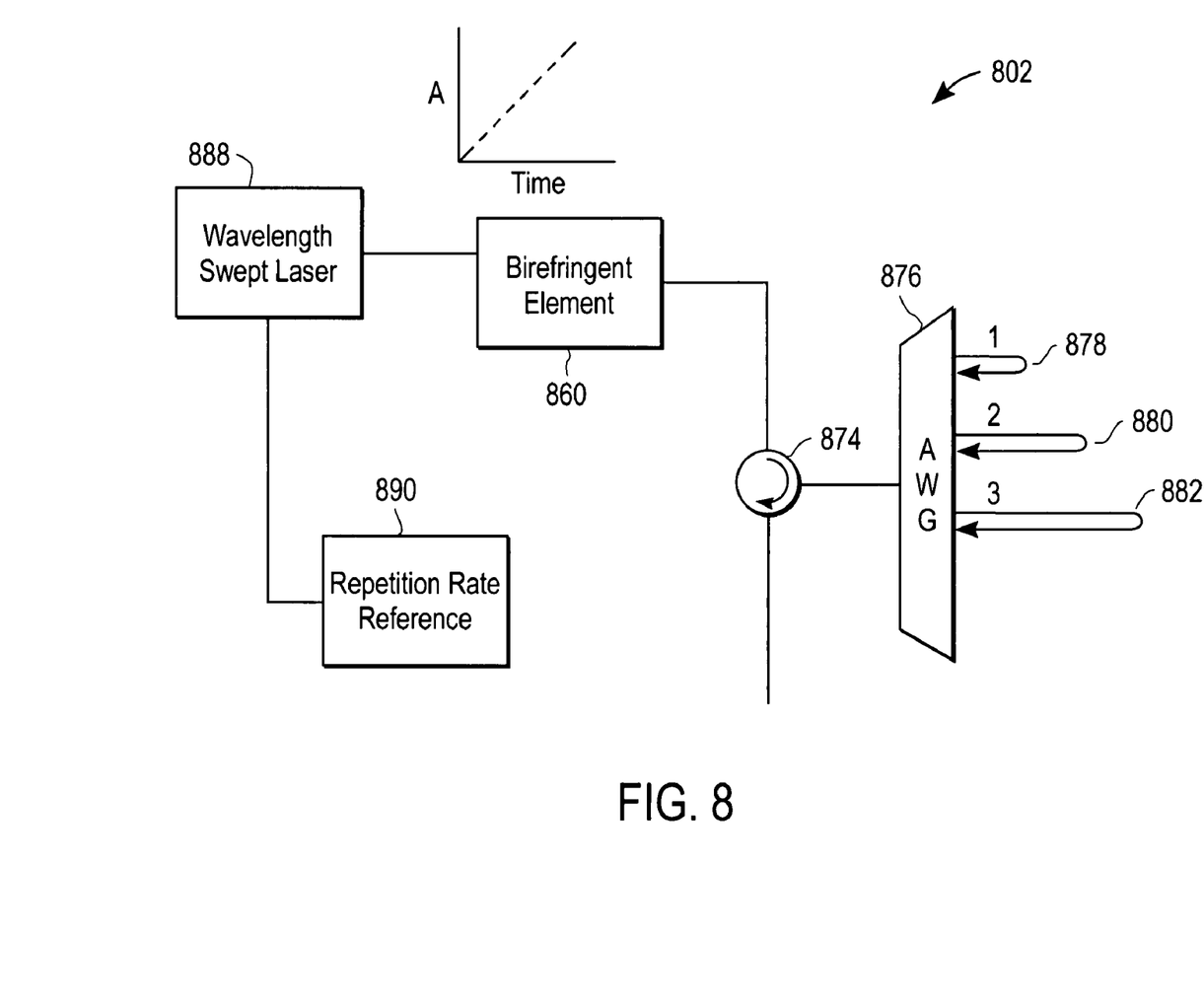
FIG. 8 is a block diagram of another embodiment of a master multiple wavelength light source.

FIG. 8 illustrates a block diagram of another embodiment of a master multiple wavelength light source. The multiple wavelength light source 802 may operate similarly to the other embodiments of the multiple wavelength light source. The light generating source may be a wavelength swept laser 888 that connects to a birefringent element 860 and a repetition rate reference 890. The wavelength swept laser 888 generates a continuously tuned or chirped wavelength whose repetition rate is equal to the channel data rate for an optical receiver. The repetition rate reference 890, such as a clock, may be connected to the wavelength swept laser 888 to ensure the repetition rate of the laser sweep matches the channel data rate. The wavelength swept laser 888 may connect to a birefringent element 860 to create multiple polarization states in each one of the channel wavelengths generated by the wavelength swept laser 888. The wavelength swept laser 888 may then connect to the optical coupler 874, which connects to the multiplexer 876. The optical delay paths 878, 880, 882 establish the time delays in the series of pulses in the light signal. The optical coupler 874 may then send that time domain multiplex and wave domain multiplex light signal to a power splitter and onto a plurality of passive optical networks.

In the forgoing specification, the invention has been described with reference to specific exemplary embodiments thereof. A simple specific example is that there may be a different number of subscribers than thirty two per passive optical network. It will, however, be evident that various modifications and changes may be made thereto without departing from the broader spirit and scope of the invention as set fourth in the appended claims. The specification and drawings are, accordingly, to be regarded in an illustration rather then a restrictive sense.

What is claimed is:

1. An apparatus, comprising:
   a multiple wavelength light source to supply a first broad band of wavelengths for a one or more passive optical networks, wherein the multiple wavelength light source to generate a series of four or more pulses of light in the first broad band of wavelengths, where each pulse of light in that series has a different center wavelength and the series of pulses of light in the first broad band of wavelengths repeat at a channel data rate of an optical receiver at a subscriber's location; as well as
   a broadband light source to supply a second broad band of wavelengths to a multiplexer/demultiplexer in a first passive optical network, wherein the multiplexer/demultiplexer to supply a separate spectral slice of the second broad band of wavelengths to a plurality of optical transmitters to wavelength lock an operating wavelength of that transmitter to the wavelength of the injected spectral slice, and an operating range of the second broad band of wavelengths is different than the operating range the first broad band of wavelengths.

2. The apparatus of claim 1, wherein the multiplexer/demultiplexer also distributes pulses from the series of pulses of light to a plurality of optical receivers in the first passive optical network.

3. The apparatus of claim 1, further comprising:
a depolarization device to cause multiple polarization states to exist in each pulse of the series of pulses of light.

4. The apparatus of claim 1, further comprising:
a polarization independent modulator to data modulate the series of pulses of light independent of the polarization of the light in the series.

5. The apparatus of claim 1, wherein the multiple wavelength light source comprises:
two or more pulsed distributed feedback lasers coupled to a second multiplexer, where a first pulsed distributed feedback laser has a center wavelength different from a center wavelength of a second pulsed distributed feedback laser;
a sequence pulse generator coupled to the first pulsed distributed feedback laser and the second pulsed distributed feedback laser, wherein the sequence pulse generator provides timing signals to synchronize the generation and data encoding of the series of pulses of light; and
a modulator to create the series of pulses of light.

6. The apparatus of claim 5, wherein the sequence pulse generator cooperates with the modulator to generate the series of pulses of light with a synchronization marker between an end of a first series of pulses of light and a start of a second series of pulses of light.

7. An apparatus, comprising:
a multiple wavelength light source containing a depolarization device, and a sequence generator, the multiple wavelength light source to generate a light signal that contains a series of multiple wavelengths, where each wavelength has its own center wavelength, and only one center wavelength is present in the light signal at a specific point in time, and the depolarization device to cause each wavelength in the light signal to have multiple polarization states; and
a data modulator to data modulate the light signal independent of the light signal having any particular polarization characteristic, wherein the sequence generator to generate signals to properly synchronize each wavelength in the light signal with the data modulator.

8. The apparatus of claim 7, wherein the multiple wavelength light source comprises:
two or more pulsed distributed feedback lasers coupled through polarization preserving fiber to a multiplexer, where a first pulsed distributed feedback laser has a center wavelength different from a center wavelength of the second pulsed distributed feedback laser; and
a depolarization device coupled through the polarization preserving fiber to the multiplexer.

9. The apparatus of claim 7, wherein the multiple wavelength light source comprises:
two or more pulsed distributed feedback lasers coupled through polarization preserving fiber to a multiplexer, where a first pulsed distributed feedback laser has a center wavelength different than a center wavelength of the second pulsed distributed feedback laser, and
a data modulator coupled to birefringent element through the polarization preserving fiber to the multiplexer.

10. The apparatus of claim 7, wherein the multiple wavelength light source comprises:
a first pulsed distributed feedback laser orthogonally polarized with respect to a second pulsed distributed feedback laser; and
an optical beam combiner coupled to both the first pulsed distributed feedback laser and the second pulsed distributed feedback laser, the optical beam combiner to combine optical signals from the second pulsed distributed feedback laser and the first pulsed distributed feedback laser to create a first wavelength pulse having a center wavelength in the light signal.

11. The apparatus of claim 7, further comprising:
an amplifier in the optical path of the series of multiple wavelengths to amplify each wavelength; and
a power splitter to distribute the amplified series of multiple wavelengths to a plurality of passive optical networks.

12. The apparatus of claim 7, wherein the multiple wavelength light source comprises:
a broadband light source to supply an optical signal containing a broadband of wavelengths; and
a modulator to modulate the optical signal at a rate equal to the channel data rate of an optical receiver at a subscriber's location.

13. The apparatus of claim 7, wherein the multiple wavelength light source further comprises:
an amplifier;
an optical coupler coupled to the amplifier; and
a multiplexer/demultiplexer to spectrally slice the broadband of wavelengths into discrete wavelengths and a plurality of optical paths coupled to the multiplexer/demultiplexer, wherein the multiplexer/demultiplexer to provide time delays to offset each pulse in the broadband of wavelengths.

14. The apparatus of claim 7, wherein the depolarization device is a polarization modulator.

15. The apparatus of claim 7, further comprising:
a power splitter to distribute the light signal to a plurality of passive optical networks.

16. The apparatus of claim 7, wherein the multiple wavelength light source comprises:
a wavelength swept laser to generate the light signal that contains multiple wavelengths;
a birefringent element coupled to the continuous wavelength swept laser; and
a multiplexer coupled to a plurality of optical delay paths to establish time delays in the series of pulses in the light signal.

17. The apparatus of claim 7, further comprising:
a broadband light source to supply a second broad band of wave lengths to a second multiplexer/demultiplexer in a first passive optical network, wherein the second multiplexer/demultiplexer supplies a spectral slice of the second broad band of wave lengths to a plurality of optical transmitters to wavelength lock the operating wavelength of that transmitter to the wavelength of the injected spectral slice.

18. A method, comprising:
generating a modulated optical bit stream that is wave division multiplexed and time division multiplexed, where the modulated optical bit stream is modulated at a time division multiplexing rate of at least three times a channel data rate of an optical receiver at a subscriber's location;

routing the modulated optical bit stream to two or more passive optical networks; and controlling the polarization characteristics of the light in the modulated optical bit stream to data modulate the modulated optical bit stream independent of the light having any particular polarization characteristic.

19. The method of claim 18, further comprising:

supplying a broad band of wave lengths to a first passive optical network, wherein a separate spectral slice of the broad band of wave lengths is distributed to a plurality of optical transmitters to wavelength lock the operating wavelength of that transmitter to the wavelength of the injected spectral slice, and an operating range of the second broad band of wavelengths is different than the operating range the first broad band of wavelengths.

20. The method of claim 18, wherein each optical bit is offset in center wavelength and in time from another optical bit and a sequence of the optical bits in the optical bit stream is repeated at the channel data rate of the optical receiver at the subscriber's location.

21. The method of claim 18, further comprising:

amplifying the each bit in the optical bit stream; and distributing the amplified optical bit stream to the plurality of passive optical networks.

22. An apparatus, comprising:

means for generating a modulated optical bit stream that is wave division multiplexed and time division multiplexed, where the modulated optical bit stream is modulated at a time division multiplexing rate of at least three times a channel data rate of an optical receiver at a subscriber's location;

means for routing the modulated optical bit stream to two or more passive optical networks; and means for controlling the polarization characteristics of the light in the modulated optical bit stream to data modulate the modulated optical bit stream independent of the light having any particular polarization characteristic.

23. The apparatus of claim 22, further comprising:

means for supplying a broad band of wave lengths to a first passive optical network, wherein a separate spectral slice of the broad band of wave lengths is distributed to a plurality of optical transmitters to wavelength lock the operating wavelength of that transmitter to the wavelength of the injected spectral slice, and an operating range of the second broad band of wavelengths is different than the operating range the first broad band of wavelengths.

24. The apparatus of claim 22, wherein each optical bit is offset in center wavelength and in time from another optical bit and a sequence of the optical bits in the optical bit stream is repeated at the channel data rate of the optical receiver at the subscriber's location.

25. The apparatus of claim 22, further comprising:

means for amplifying the each bit in the optical bit stream; and means for distributing the amplified optical bit stream to the plurality of passive optical networks.

26. An apparatus, comprising:

a multiple wavelength light source containing a depolarization device, the multiple wavelength light source to generate a light signal that contains a series of multiple wavelengths, where each wavelength has its own center wavelength, and only one center wavelength is present in the light signal at a specific point in time, and the depolarization device to cause each wavelength in the light signal to have multiple polarization states; and a data modulator to data modulate the light signal independent of the light signal having any particular polarization characteristic, wherein the data modulator has a detector to recover the synchronization data for series of pulses to properly synchronize each wavelength in the light signal with the data modulator.

* * * * *